(12) United States Patent
Gao et al.

(10) Patent No.: US 7,719,564 B2
(45) Date of Patent: May 18, 2010

(54) PLUG-IN KILN VIDEO CAMERA AND IMAGE PROCESSING SYSTEM

(75) Inventors: Zhengkai Gao, Beijing (CN); Chengping Zhao, Beijing (CN); Yunying Wu, Beijing (CN); Jian Lin, Beijing (CN); Yong Gao, Beijing (CN)

(73) Assignees: University of Science and Technology Beijing, Beijing (CN); Shenwang Pioneer Tech Corporation Beijing, Beijing (CN)

( * ) Notice: Subject to any disclaimer, the term of this patent is extended or adjusted under 35 U.S.C. 154(b) by 1254 days.

(21) Appl. No.: 10/519,420

(22) PCT Filed: Jun. 25, 2003

(86) PCT No.: PCT/CN03/00491

§ 371 (c)(1),
(2), (4) Date: Aug. 24, 2005

(87) PCT Pub. No.: WO04/002136

PCT Pub. Date: Dec. 31, 2003

(65) Prior Publication Data

US 2006/0050147 A1 Mar. 9, 2006

(30) Foreign Application Priority Data

Jun. 25, 2002 (CN) ................................ 02 1 21548

(51) Int. Cl.
*H04N 7/18* (2006.01)
(52) U.S. Cl. .............................. 348/83; 348/82; 431/79
(58) Field of Classification Search .................... 348/83
See application file for complete search history.

(56) References Cited

U.S. PATENT DOCUMENTS

| 4,695,881 A * | 9/1987 | Kennedy et al. | 348/83 |
| 6,229,563 B1 * | 5/2001 | Miller et al. | 348/83 |
| 6,912,007 B2 * | 6/2005 | Gin | 348/373 |
| 2001/0014436 A1 * | 8/2001 | Lemelson et al. | 431/12 |

FOREIGN PATENT DOCUMENTS

| DE | 19649264 | 6/1998 |
| JP | 09-307795 | 11/1997 |

* cited by examiner

*Primary Examiner*—Marsha D Banks Harold
*Assistant Examiner*—Christopher Findley
(74) *Attorney, Agent, or Firm*—Fay Sharpe LLP

(57) ABSTRACT

The present invention provides a video camera plugged into kiln to monitor and an image processing system using the camera. The video camera is composed of a camera body, a video recorder, a monitor, and a digital thermometer; the image processing system is composed of the camera body mentioned above, a computer and a color monitor. Especially, the present invention is used to monitor material surface during the smelting in a blast furnace; process the image by a computer, describing quantificationally the airflow and temperature distribution of the material surface; monitor the operation state of charging chute or bell, the material stream, and the abnormality in the furnace such as pipeline and material collapse. The advantages of the present invention: Micro camera used to obtain IR image in the furnace, pint-sized, low cost, easy installation, simple maintenance, long service life, and the maintenance performed without stopping production.

4 Claims, 2 Drawing Sheets

PLUG-IN KILN VIDEO CAMERA AND IMAGE PROCESSING SYSTEM

TECHNICAL FIELD

The present invention belongs to the process monitoring and control technology field for industrial furnace & kiln, especially relates to a plug-in furnace & kiln-oriented video camera and an image processing system to use the plug-in furnace & kiln-oriented video camera.

BACKGROUND OF THE INVENTION

In many fields of industrial production, various furnaces & kilns must be used, for example, in the metallurgy industry, it is necessary to use the vertical furnace such as blast furnace for iron-making etc., and the other furnaces & kilns. In order to obtain the basis to guide the operation, the operators should grasp the temperature distribution of the burden in these industrial furnaces & kilns. But as these industrial furnaces & kilns are in the status of relative isolation from the outside world, and the gas flow above the burden always contains dusts, various harmful gases and vapors, thus it is very difficult to make observation for the burden in the furnace & kiln.

In order to resolve the above-mentioned problems, people try to use the methods to perforate holes on the furnace shell above the furnace & kiln, and to use observation instrument outside the furnace for observation, and they have got certain advances. For example, in the beginning of the nineties of the $20^{th}$ century, 'video camera for monitoring the temperature of the burden at the top of blast furnace' (China invention patent, Patent no. 90102986), 'video camera for monitoring' (China invention patent, Patent no. 94115659), and the thermal image instrument to get the image of temperature distribution for the burden by use of mechanical scanning, and to use these devices to observe the status of the burden and to analyze the temperature distribution at the burden for guiding the operation of blast furnace. These achievements have made rapid headway for opening the status within the above-mentioned industrial furnaces & kilns, especially within the blast furnace for iron-smelting likes black box.

However, there are many shortcomings in the above-mentioned observation devices with the present technology. For example, the video camera installed at the outside of the furnace shell is huge in size and its cost is high; The observation hole is very big, and the moving and guard device is complex; The scanning device must be always replaced due to its short life; And the consumption quantity of guard gas is large, and the cost of production and guard is high etc. On the other hand, for the lens of video camera and the window in the process of use in blast furnace, it is easy to form ashes. Failures always occur in the complex valve for window and mechanical focussing device. Once these conditions occur, it is impossible to continue observation. Moreover, as the furnace & kiln using these observation devices always work in the form of continuous production, however these devices with the present technology can be serviced only when the production is stopped. Taking blast furnace as example, they can be processed only when the blast is stopped.

As there exist these problems for the above-mentioned devices, it leads to the fact that it is impossible to use them to further form the reliable image processing system, and therefore they can not be given popularized application all the way. Therefore, the problems faced in the technology field is that it is imperative to have a kind of new-typed plug-in furnace & kiln-oriented video-camera to be able to overcome the above-mentioned shortcomings, and the image processing system to use this kind of plug-in furnace & kiln-oriented video camera.

SUMMARY OF THE INVENTION

In view of the above-mentioned conditions, the technical problems the invention tries to resolve is: to provide a video camera inserted in the furnace shell for observing the interior conditions of industrial furnace & kiln, which overcomes the above-mentioned shortcoming found in prior art, and an image processing system to use the video camera. The video camera and the image processing system to use the video camera are especially suitable for use in monitoring the working conditions of the burden within the furnace in the smelting process of blast furnace for iron-smelting, and computers are used to make image processing, and to give quantitative description of the distribution conditions of gas flow and temperature for the burden, and as well as to monitor the working conditions of chute or bell, charge flow conditions during charging of the burden, and the abnormal conditions for pipeline and collapsing charge etc. found within the furnace.

In order to achieve the above-mentioned objects, the inventor first make laboratory research, and then to make industrial experiments repeatedly at many iron-making furnaces. Through continuous improvement and perfection, at last the invention is completed.

The contents of the invention are as follows:

1. The content of the first item for the invention is a plug-in furnace & kiln-oriented video camera, characterized in comprising a body of a video camera, video recorder, monitor, digital thermometer;

The body comprises a video camera, pick-up gun, pipe-typed cooler, sealing device, sight hole, blow-down ring and temperature—measurement element;

The video camera is installed at the front end of the pick-up gun, and inserted in the furnace passing through pipe-typed cooler installed on the short flange pipe of furnace shell;

The temperature-measurement element is located near the top of the video camera within the pick-up gun;

Ring gap is formed between the blow-down ring and the video camera;

Double seal structure is based on valve and sealing sheath;

Wide angle lens are used for video camera, with the angle of view up to 90~120°;

Double gas protection mode by means of inner wind of sight hole and blow-down wind of the blow-down ring gap outside the sight hole;

Video recorder, monitor, and digital thermometer are located outside furnace shell, respectively connected through cable line to the video camera and temperature-measurement element.

2. The content of the second item for the invention is that, in the plug-in furnace & kiln-oriented video camera in the content of the above-mentioned first item, the said industrial furnace & kiln is blast furnace for iron-smelting;
the said video camera is micro video camera;
the diameter range of the said pipe-typed cooler is 60~200 mm, with the length range up to 200~3000 mm;
the aperture of the sight hole is $\phi 3 \sim \phi 5$ mm;
the width of the said blow-down ring gap is 0.2~3.0 mm.

3. The content of the third item for the invention is that, in the plug-in furnace & kiln-oriented video camera given in the content of the above-mentioned item 2, CCD (charge coupled device) with wide light sensing range is used for the said micro video camera.

4. The content of the fourth item for the invention is an image processing system characterized in comprising the following devices:

a body of video camera, which uses the said body of video camera given in the second item and the third item of the invention, where under the conditions without visible light in the production of blast furnace, it receives the infrared emitted from the burden and transforms it into the infrared image of the burden within the furnace and its adjacent equipment;

a computer, which obtains the quantitative data of gas distribution and temperature for the burden based on the image processing for the image; and a color monitor, which displays the distribution status of temperature or gas flow for the burden in the form of super twisted nematic (STN) color graph, numerical graph, and curve graph based on the relative relation between the strength of infrared rays and the object subjected to measurement, to change the gray value of the above-mentioned points into temperature value.

Further description is given to the technical characteristics of the plug-in furnace & kiln-oriented video camera of the invention.

The invention does not use the way used in the prior art with the observation instrument set up outside the furnace, but it uses the video camera inserted in the furnace & kiln for observation in a creative way.

The pipe-typed cooler set up for the plug-in furnace & kiln-oriented video camera for the invention is supplied with water from valve and discharged from the water discharge port, to ensure the cooling action, so as to make the video camera work under the permitted temperature.

The plug-in furnace & kiln-oriented video camera of the invention uses the way of double gas protection based of the inner wind of the sight hole and the blow-down from outside the sight hole, to ensure the video camera inserted in the furnace shell to continuous work for long time under the adverse conditions of high temperature, high pressure, highly-contained dust and high humidity.

The double sealing structure of valve and sealing sheath is used to make it possible to make service in the process of production.

The temperature-measurement element is set up near the above of the video camera for the plug-in furnace & kiln-oriented video camera in the invention, so it is possible to grasp the working temperature of the video camera in real time.

The micro video camera for the plug-in furnace & kiln-oriented video camera in the invention can use the CCD with wide range of light sensing in accordance with the need. Under the conditions without the visible light within the furnace in the production of furnace & kiln, CCD can receives the infrared light emitted from the furnace charge within certain temperature range, transformed into the infrared image for the burden and equipment within the furnace, which undergoes image processing then by use of computer for the image. Then it is possible to get the quantitative data of the gas distribution and temperature distribution for the burden.

The lens of wide angle is used for the plug-in furnace & kiln-oriented video camera for the invention, with its angle of view up to 90~120°, therefore the observation range is enlarged. Taking the blast furnace of iron-smelting as example, only one video camera is used to be able to observe the working conditions of the whole burden and the equipment such as chute or bell, thus reduces the investment in equipment and the operating cost, and avoids the difficult problem to make composition for the incomplete pictures with different angles in use of more than two sets of video cameras. And therefore it creates favorable conditions for processing pictures of the burden.

Then, further explanation is given to the image processing system of the invention.

Different from the existing processing system for thermal image, the image processing system of the invention is composed of the body of video camera, computer and color monitor of the invention. Thus, it is different from the prior art to use the mechanical method for the measurement of the temperature at each point on the burden, and then to compose the temperature distribution picture for the whole burden. But it uses the CCD with wide range of light sensing, under the conditions without visible light in the furnace in the production of furnace & kiln, after CCD receives the infrared light emitted from the burden within certain temperature range, it can transform the light into the infrared image for the burden and equipment in the furnace, and it can meanwhile get the infrared image of the whole burden. Then the computer is used to make image processing for the infrared image. In accordance with the relative relation between the strength of infrared light and the object experiencing measurement, the gray values for various points on the image are transformed into the temperature values. Then in the forms of super twisted nematic color graph, numerical graph, and curve graph etc., the distribution conditions of temperature or gas flow for the burden are displayed at the color monitor. Thus, it is possible to guide the operation on the above-mentioned basis.

The advantages of the invention lie in the use of micro video camera without moving parts to get the infrared image in the furnace, small shape of the device, low cost of construction, convenience in installation, simple maintenance, long life, small aperture for the sight hole, narrow gap for blow-down ring, good effect in protection, small consumption quantity for protection gas, and low cost in use. The plug-in furnace & kiln-oriented video camera and the image processing system to use the plug-in furnace & kiln-oriented video camera of the invention is suitable for use in many kinds of industrial furnace & kiln. For example, they are suitable for use in the vertical furnace and the other furnace & kiln with blast furnace of iron-smelting as its representative, and especially for use in the charge-less bell-typed furnace or double charge bell-typed blast furnace with various volumes.

Figure 1:
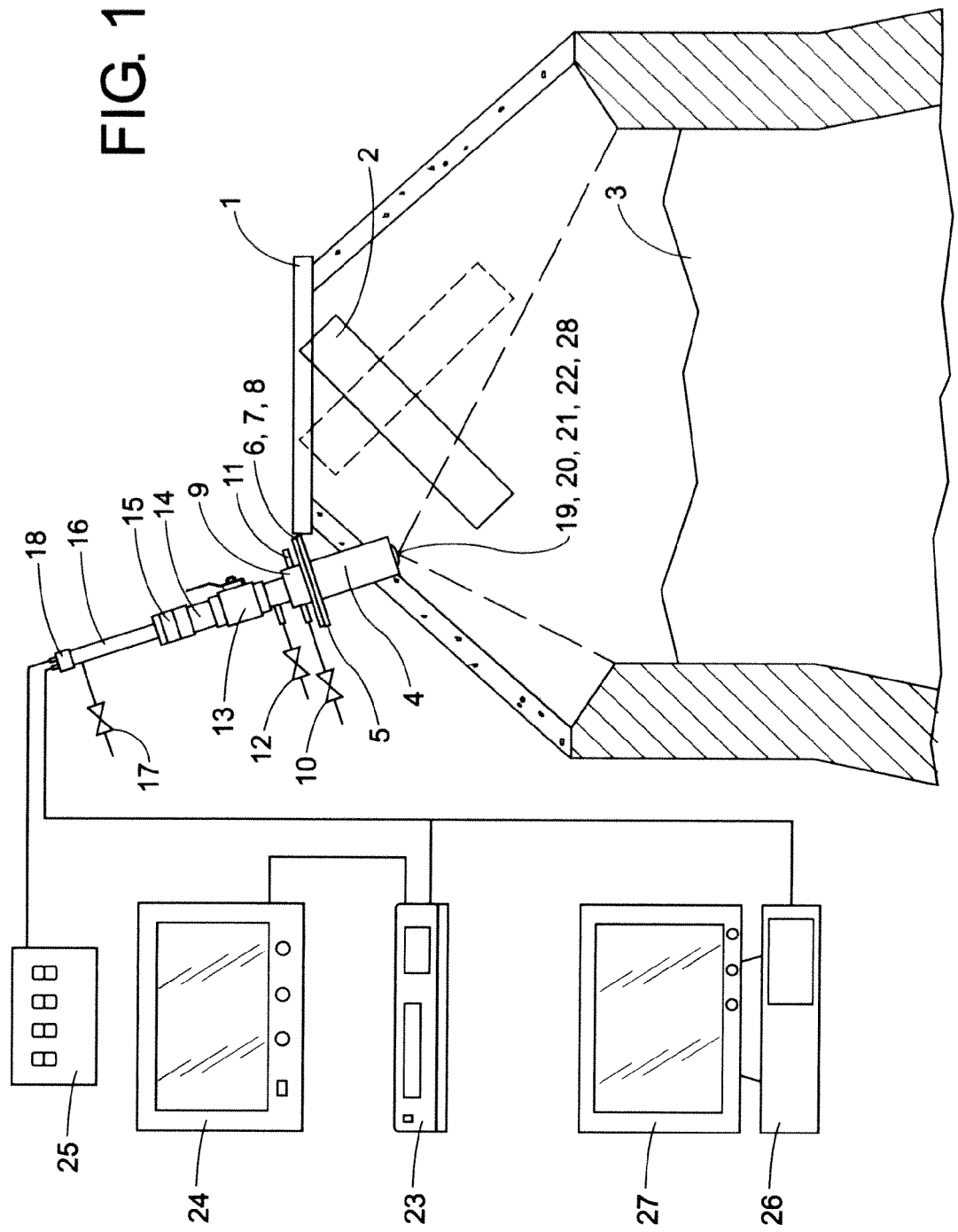
FIG. 1 is a general schematic diagram for one embodiment of the invention.

EXPLANATION OF THE SYMBOLS IN THE DRAWINGS 1 blast furnace
2 chute
3 burden
4 flange short pipe
5 sealing pad
6 bolt
7 washer
8 nut
9 pipe-typed cooler
10 valve
11 outlet 12 valve
13 valve
14 connecting pipe
15 sealing sheath
16 pick-up gun
17 valve
18 connection cup
19 video camera
20 temperature measurement element
21 sight hole
22 blow-down ring
23 video recorder
24 monitor
25 digital thermometer
26 computer
27 color monitor
28 gap of blow-down ring

DETAILED DESCRIPTION OF THE INVENTION

Figure 2:
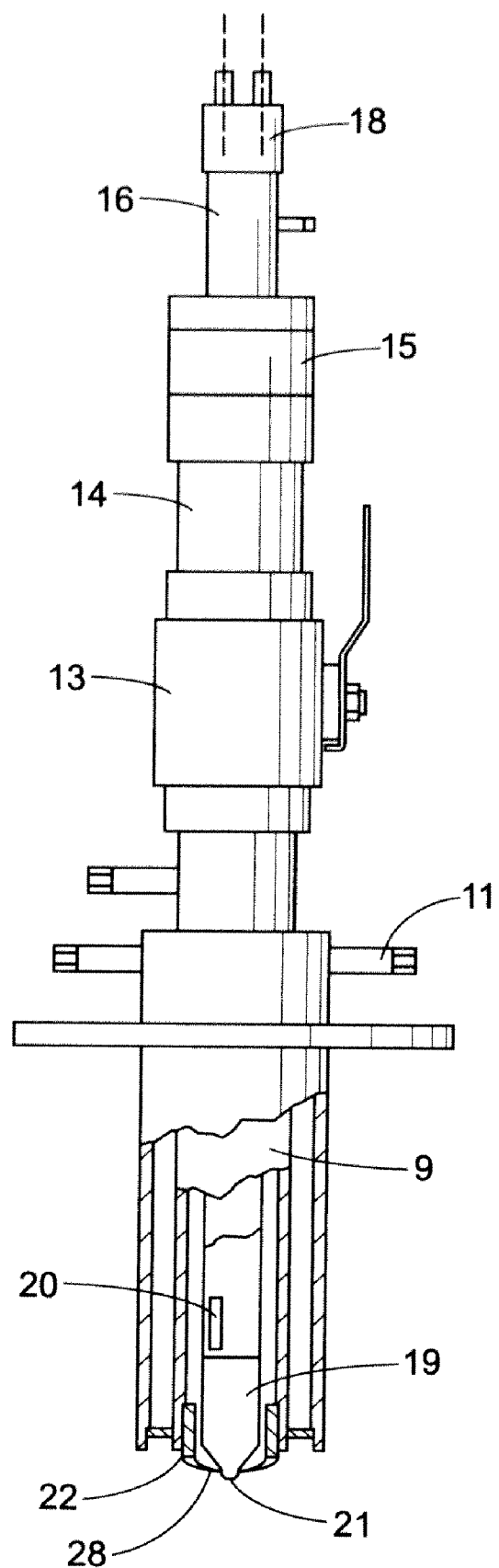
FIG. 2 is a schematic diagram for the structure of the body for the video camera in the invention.

Now, the concrete mode of carrying out the invention is explained in reference to the attached FIG. 1 and FIG. 2.

FIG. 1 is the general schematic diagram for an embodiment of the invention. FIG. 2 is the schematic diagram for the structure of the body for the video camera used in the above-mentioned embodiment. The embodiment responds to the blast furnace of iron-making of the concrete industrial furnace & kiln.

As shown in FIG. 1, the embodiment in the same time uses the video camera consisting of the body of the video camera, video recorder 23, monitor 24, and digital thermometer 25; the image processing system consists of the body of video camera, color display 26 and computer 27. As shown in FIG. 2, the body of video camera consists of pick-up gun 16, pipe-typed cooler 9, sealing device 15, sight hole 21, blow-down ring 22, temperature-measurement element 20, and video camera 19. The video camera is installed at the front end of pick-up gun 16, and it is inserted in the furnace through the pipe-typed cooler installed at the flange short pipe 4 of furnace shell, with the diameter range of the pipe-typed cooler 9 at 60~200 mm, and the length range at 200~3000 mm. The way of protection based on double gases of the inner wind from sight hole 21 and exterior blow-down from sight hole is used to ensure the video camera inserted in the furnace shell to be able to continuously work for long term under the adverse conditions of high temperature, high pressure, highly contained dust, and high humidity in blast furnace, with the aperture of sight hole 21 at ϕ3~ϕ15 mm, and width formed between blow-down ring 22 and video camera 19 at 0.2~3.0 mm. The double sealing structure formed by valve 13 and sealing sheath ensures video camera to be serviced in the production process. As there is not visible light at burden 3 and its above, thus the micro video camera for the video camera uses CCD with wide range of light sensing, after CCD receives the infrared light emitted at certain range of temperature by furnace charge, CCD transforms it into infrared image of burden and equipment. The computer 26 is used to make image processing for the image to get the quantitative data to reflect the distribution of gas flow and temperature distribution of burden 3. The video camera uses lens of wide angle, with angle of view at 90~120°, thus, it is possible to observe the working conditions of the whole burden 3, cloth chute 2 and the adjacent equipment by use of only one video camera. Thus it reduces the investment in equipment and operating cost, and avoids the difficult problem to compose two incomplete images in different angles in time of using two sets of video cameras. Thus it creates advantageous conditions for processing images of burden.

The implementation process of the embodiment is as follows:

To perforate the proper positions at furnace top and furnace shell of blast furnace 1 and to weld flange short pipe 4. To insert pipe-typed cooler 9 into the furnace through sealing pad 5 and flange short pipe 4. It is necessary to firmly install coolers and to ensure sealing by use of bolt 6, washer 7 and nut 8. To supply cooling water from valve 10 to cooler 9. To discharge water from discharge port to ensure the cooling action, so as to make the whole video camera work at the permitted temperature. To pass the protection gas (nitrogen gas or purified gas) into blast furnace from valve 12, and to make continuous blow-down toward sight hole through blow-down gap between blow-down ring 22 and video camera 19. The video camera 19 for special use and temperature measurement element 20 are installed at the front end of pick-up gun 16, and it is inserted to the front end of cooler through sealing sheath 15, connecting pipe 14 and valve 13. The other way of protection gas (nitrogen gas or purified gas) passes into video camera from valve 17, and the gas is blown into the furnace from sight hole 21 at the front end of video camera, to ensure the isolation of gas in furnace from the lens of video camera, and to ensure video camera to continuously work for long term under the adverse conditions of high temperature, high pressure, high contained dust, and high humidity in blast furnace. When maintenance is needed for the video camera and the other elements, due to double sealing for pick-up gun through sealing sheath 15 and valve 13, thus it is possible to extract pick-up gun 16 above valve 13 in the production process of blast furnace. Then the valve 13 is closed. Thereafter pick-up 16 is drawn out together with pick-up 19 and temperature element 20 from sealing sheath 15. It is not necessary to stop production in time of servicing. As CCD with wide range of light sensing is used, thus under the conditions without visible light in blast furnace, CCD can receive the infrared light emitted from furnace charge in certain range of temperature, and transforms it into the infrared image of the equipment in furnace in furnace such as burden 3 and chute 2 etc. As the lens of video camera has angle of view up to 90~120°, it is possible to use only one set of video camera to observe the working conditions of the equipment in furnace such as the whole burden 3, chute 2 and stock-rod etc., so as to create advantageous conditions for image processing for burden. The visual signal of video camera 19 and the signal of temperature measurement 20 is extracted from sealed cup 18 of connecting line, sent to guards' room through special cable, connected to video recorder 23, monitor 24, digital thermometer 25, to ensure the operators to be able to see and record the working conditions of the equipment in furnace such as burden 3 and chute 2 etc., and to know the working status through the temperature of video camera 19. Meanwhile the visual signal can be inserted to computer 26 for image processing. The quantitative data for distribution of gas flow and temperature distribution can be displayed at color monitor 27 in the forms of super twisted nematic color graph, numerical graph, and curve graph, for use in guiding the operation of blast furnace.

The inventor makes industrial experiment at several blast furnaces in accordance with the above-mentioned implementation patterns. The practice proves that for the plug-in furnace & kiln-oriented video camera and the image processing system of the invention, in addition to be able to obtain the above-mentioned beneficial effects, they have the following advantages: the video camera of the invention can be continuously used for long term, and they can be serviced under the conditions without stopping production.

Although the above-mentioned embodiment takes the blast furnace of iron-making as example, however what the technicians of the field can easily understand is the plug-in furnace & kiln-oriented video camera and image processing system are not only suitable for blast furnaces, but also suitable for various vertical furnaces and the other industrial furnaces & kilns.

The invention claimed is:

1. A plug-in furnace and kiln-oriented video camera, comprising:
 a body of a video camera, a video recorder (23), a monitor (24) and a digital thermometer (25);
 wherein the body of a video camera comprises a video camera (19), a pick-up gun (16), a pipe-typed cooler (9), a sealing device (15), a sight hole (21), a blow-down ring (22), and a temperature measurement element (20);
 wherein the video camera (19) is installed at a front end of pick-up gun (16), inserted into the furnace through the pipe-typed cooler (9) installed at the flange short pipe (4) of a furnace shell;
 wherein the temperature measurement element (20) is located near the top of video camera (19) in pick-up gun (16);
 a ring gap 28 of said video camera (19) is formed between said blow-down ring (22) and said video camera (19);
 a double sealing structure of valve (13) and said sealing device (15);
 wherein said video camera (19) comprises a lens of wide angle, with an angle of view in the range of 90-120 degrees;
 a double gas protection for blow-down wind through the ring gap via an inner wind from sight hole (21) and an outside blow-down from sight hole (21);
 a video recorder (23), monitor (24) and digital thermometer (25) are placed outside the furnace shell, connected through a cable line to the video camera (19) and the temperature measurement element (20);
 wherein the furnace and kiln comprise a blast furnace of iron-smelting (1);
 wherein the video camera (19) is a micro video camera;
 wherein the pipe-typed cooler (9) has a diameter ranging up to 60-200 mm and a length ranging up to 200-3,000 mm;
 wherein the sight-hole (21) has an aperture up to Φ3-Φ15 mm; and
 wherein the width of the gap of the blow-down gap (28) is 0.2-3.0 mm.

2. The plug-in furnace and kiln-oriented video camera of claim 1, wherein the micro video camera uses CCD with a wide range of light sensing.

3. The image processing system of claim 1, wherein the micro video camera uses CCD with a wide range of light sensing.

4. An image processing system, comprising:
 a body of a video camera, which receives infrared light emitted from a furnace charge and the light is transformed into an infrared image of a burden and an adjacent equipment in a furnace, when the furnace operates without visible light;
 a computer for making an image process for the image, and obtaining the quantitative data of gas distribution and temperature distribution of the burden; and
 a color monitor, in accordance with a relative relation between the strength of infrared light and the temperature of a measured object, to transform gray values of various points in the image into temperature value, and to be displayed in the distribution status of temperature or gas for the burden in the forms of a STN color diagram, a numerical diagram and a curve diagram;
 wherein the video camera (19) is a micro video camera;
 wherein the video camera comprises:
 a pipe-typed cooler (9) having a diameter ranging up to 60-200 mm and a length ranging up to 200-3,000 mm;
 a sight-hole (21) having an aperture up to Φ3-Φ15 mm;
 a blow-down ring (22), wherein a ring gap (28) is formed between said blow-down ring (22) and said video camera (19); and
 the width of the gap of the blow-down gap (28) is 0.2-3.0 mm.

* * * * *